(12) United States Patent
Murching et al.

(10) Patent No.: US 6,234,243 B1
(45) Date of Patent: May 22, 2001

(54) HEAT EXCHANGER ASSEMBLY WITH MAGNESIUM BARRIER

(75) Inventors: Nagendra Narayana Murching, Westland; Timothy Van Evans, Ann Arbor, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/460,904

(22) Filed: Dec. 14, 1999

(51) Int. Cl.[7] .............................. F28F 21/08; B23K 1/19; B23K 31/02
(52) U.S. Cl. ...................... 165/133; 228/183; 428/654
(58) Field of Search ........................... 165/133; 228/183, 228/223, 226; 428/654, 545, 548

(56) References Cited

U.S. PATENT DOCUMENTS

| | | | |
|---|---|---|---|
| 3,891,400 | * 6/1975 | Robinson | 29/197.5 |
| 4,209,059 | * 6/1980 | Anthony et al. | 165/133 |
| 5,069,980 | * 12/1991 | Namba et al. | 428/654 |
| 5,316,863 | * 5/1994 | Johnson et al. | 428/548 |
| 5,422,191 | 6/1995 | Childree . | |
| 5,771,962 | 6/1998 | Evans et al. . | |
| 6,120,848 | * 11/1998 | Van Evans et al. | 427/359 |

* cited by examiner

Primary Examiner—Allen Flanigan
(74) Attorney, Agent, or Firm—Larry I. Shelton

(57) ABSTRACT

The invention involves a heat exchanger assembly comprising at least one aluminum based tube including magnesium, an aluminum based cladding, and at least one aluminum based component disposed adjacent the cladding. A brazing flux is applied to a joint between the cladding and the component to facilitate brazing in an ambient atmosphere. An aluminum based lithium enriched layer is disposed between the tube and the cladding to scavenge sufficient oxygen from the ambient atmosphere to form an effective barrier against the defusion of magnesium from the tube.

15 Claims, 1 Drawing Sheet

HEAT EXCHANGER ASSEMBLY WITH MAGNESIUM BARRIER

TECHNICAL FIELD

The present invention relates generally to an improved heat exchanger for automotive vehicles manufactured by controlled atmosphere brazing ("CAB").

BACKGROUND ART

Many automotive vehicles include heat exchangers such as condensers, evaporators, heater cores and coolers generally made of aluminum or aluminum alloys. These heat exchangers are alternating rows of tubes or plates. The heat exchangers often include convoluted fins brazed to the external surfaces of the tubes and turbulators disposed within the tubes and brazed to their inner surfaces. One way of brazing the fins and turbulators to the tube surfaces is by a vacuum furnace. Also, a process known as "controlled atmosphere brazing" (CAB) has been employed.

CAB furnace brazing typically is preferred over vacuum furnace brazing due to improved production yields, lower furnace maintenance requirements and greater braze process robustness. When aluminum components are exposed to air, the surface layer oxidizes and forms aluminum oxide. Although heat exchangers are pre-cleaned using alkaline cleaning agents which reduce the native aluminum oxide layer, the surface of the heat exchanger will re-oxidize in the CAB furnace due to the presence of the oxygen and water vapor in the nitrogen gas used in the furnace. In order to braze aluminum components together, a flux is provided at a joint between the tube and any component to be joined thereto in order to disrupt any aluminum oxide which might interfere with the formation of a sound joint. A flux commonly used in CAB furnace brazing is NOCOLOK™ (potassium fluoaluminate represented often as "KALF").

Magnesium is commonly included in aluminum based tubing or core materials to improve their strength and corrosion resistance. Magnesium is also generally included in the aluminum alloy cladding generally disposed on the core materials. U.S. Pat. No. 5,422,191, issued Jun. 6, 1995, to Childree discloses aluminum cladding materials which include lithium in addition to magnesium to increase the post braze strength of the brazed joint. Childree teaches that for CAB processing, NOCOLOK™ flux can be used.

U.S. Pat. No. 5,771,962, issued Jun. 30, 1998, to Evans et al. which is incorporated herein by reference discloses that the use of a standard KALF flux works less than desirable with core and clad materials which contain desirably high levels of magnesium. Evans et al. teaches a modified aluminum brazing flux including lithium fluoride, cesium fluoride or their mixture into an aluminum flux like NOCOLOK™. Evans teaches that because the lithium and cesium in the flux have relatively low melting temperatures compared to magnesium, the lithium and cesium will melt first and flow into the joint area before the magnesium forming a sound braze joint.

As disclosed in Evans et al., the magnesium melts during processing and flows into the joint area. At high processing temperatures, magnesium readily forms magnesium oxides which are not broken down by conventional aluminum fluxes such as KALF and hence this oxide and the aluminum oxides present on the aluminum surfaces interfere with the integrity of the brazed joint. Such interferences occur by reducing the "wetability" of the molten clad layer and its ability to form an effective braze joint. Additionally, because a conventional KALF flux is not effective in CAB brazing for disrupting the complex MgO and $Al_2O_3$ surface oxide, if and when wetting does occur, the braze joint is discontinuous and does not represent a sound braze joint. The end result of using a conventional KALF flux is a heat exchanger with porous and weak braze joints.

The heat exchanger assembly disclosed in Evans et al. has an aluminum based alloy cladding disposed on the core materials. The cladding may include a weight percentage of lithium (Li) along with other elements. The inclusion of the lithium in the clad material acts to lessen the magnesium from migrating out of the core material, creating a barrier to lessen the formation of undesirable magnesium oxides which interfere with the formation of a sound braze joint.

Although the cladding disclosed in Evans et al. provides a magnesium barrier, it is desirable to reduce the amount of lithium used. The less lithium needed to establish a sufficient magnesium barrier, the less aluminum is required, thereby reducing the weight of the cladding and, in turn, reducing costs.

Thus, what is needed is a more efficient magnesium barrier within a heat exchanger assembly.

Although the core material used in Evans et al. is strong, it is desirable to use the strongest core material as is economically feasible. The stronger the core material used, the lighter the heat exchange assembly will be, thereby reducing manufacturing cost and increasing fuel efficiency.

Thus, what is needed is a stronger core material of a heat exchanger assembly to lessen the weight thereof.

DISCLOSURE OF THE INVENTION

Accordingly, it is an object of the present invention to provide a more efficient magnesium barrier within an improved heat exchanger assembly.

It is a further object of the present invention to provide a stronger tubing or core material of a heat exchanger assembly to lessen the weight thereof.

A more specific object of this invention is an improved heat exchanger assembly. The improved heat exchanger assembly includes at least one aluminum based tube including magnesium adapted to be exposed to an ambient atmosphere and having an internal surface and an external surface, an aluminum based cladding disposed adjacent one of the internal and external surfaces, and at least one aluminum based component disposed adjacent the cladding. A brazing flux is applicable between the aluminum based cladding and the aluminum based component to facilitate brazing in the ambient atmosphere. An aluminum based lithium enriched layer is disposed between the one of the internal and external surfaces and the aluminum based cladding. The aluminum based lithium enriched layer is adapted to scavenge sufficient oxygen from the ambient atmosphere to form a sufficient barrier against the diffusion of magnesium from the aluminum based tube that the formation of undesirable magnesium oxide is resisted.

Another specific object of this invention is a method of manufacturing an improved heat exchanger assembly for an automotive vehicle. The method includes providing at least one aluminum based tube including magnesium adapted to be exposed to an ambient atmosphere and having an internal surface and an external surface, applying an aluminum based lithium enriched layer to at least one of the internal and external surfaces, and applying an aluminum based cladding to the aluminum based lithium enriched layer. Then, the method further includes disposing at least one aluminum based component adjacent the cladding, and applying a brazing flux to a joint between the cladding and the at least one aluminum based component to facilitate brazing in the ambient atmosphere. Finally, the method includes joining the at least one tube and the at least one aluminum based component together in the ambient atmosphere using a controlled atmosphere brazing process.

Other features and advantages of the present invention will become apparent from the following discussions taken in conjunction with the accompanying drawings.

BRIEF DESCRIPTION OF THE DRAWINGS

FIG. 3 is an enlarged view of a portion of the sectional view in circle 3 of FIG. 2; and FIG. 4 is an enlarged view of a portion of the sectional view in circle 4 of FIG. 1.

BEST MODES FOR CARRYING OUT THE INVENTION

Figure 1:
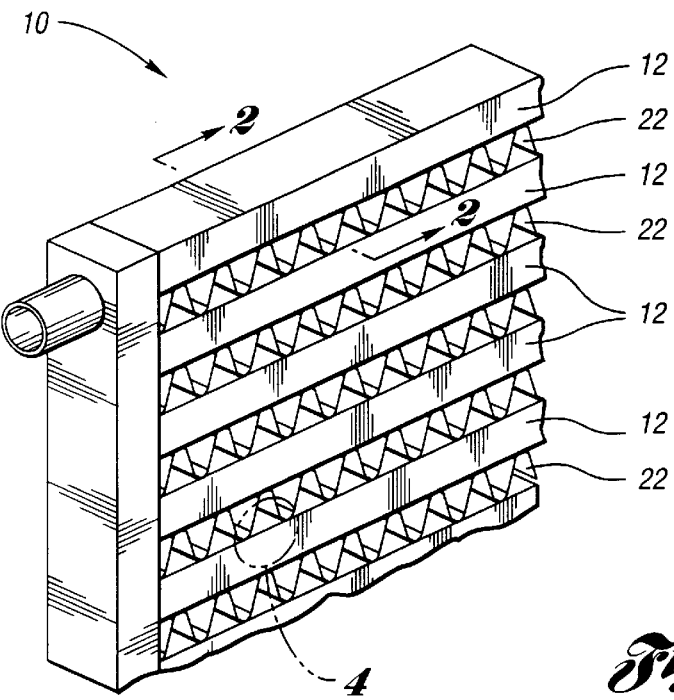
FIG. 1 is a perspective view of an improved heat exchanger assembly according to the present invention.

Referring to FIG. 1, one embodiment of a heat exchanger assembly 10, according to the present invention, is shown. In this example, heat exchanger assembly 10 is a condenser for an air conditioning system (not shown) of a vehicle such as an automotive vehicle (not shown). It should be appreciated that heat exchanger assembly 10 may be a parallel flow condenser, serpentine evaporator, heater core, or transmission oil cooler.

Figure 2:
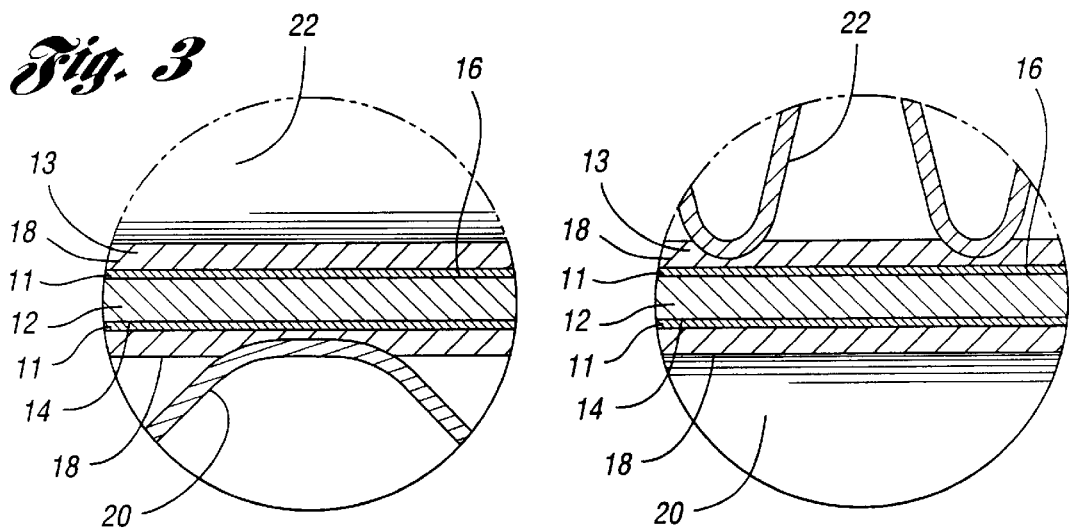
FIG. 2 is a sectional view of one tube in the heat exchanger assembly taken along line 2—2 of FIG. 1.
Figure 2:
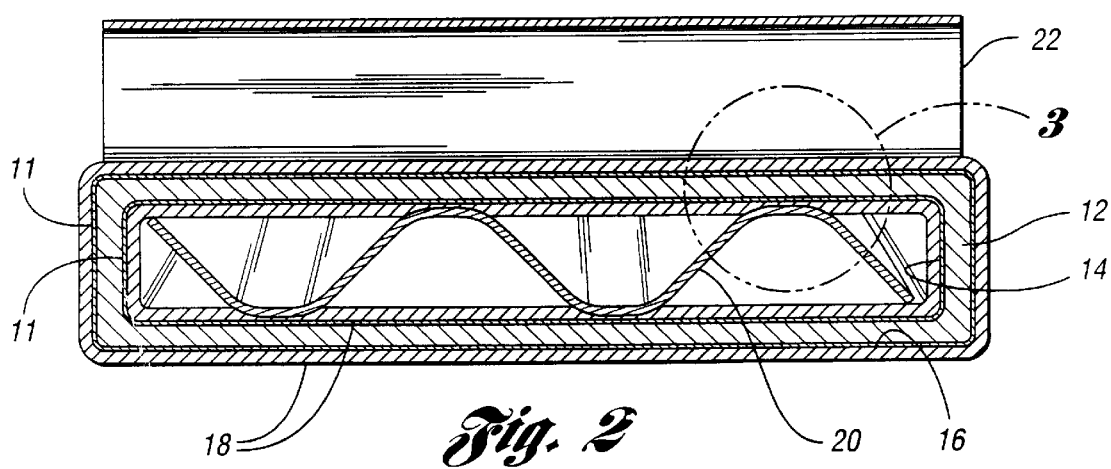

Referring to FIGS. 1 and 2, heat exchanger assembly 10 includes at least one tube 12 made of aluminum based core material. Preferably, assembly 10 includes a plurality of tubes 12. By "aluminum based" with respect to the tube, cladding, and other components used in this document is meant that the aluminum based material comprises mostly aluminum, but may be alloyed with other metals like silicon, copper, magnesium, zinc and so forth. Each tube 12 extends longitudinally and is generally rectangular in shape. The aluminum based core material of tube 12 is preferably selected from the Aluminum Association 1XXX, 3XXX, 5XXX, and 6XXX series aluminum alloys. The core material may and desirably does include magnesium. Preferably, the core material includes magnesium in an amount up to about 3% by weight, more preferably being between about 0.4 and 2.5% by weight.

Tube 12 has an internal surface 14 and an external surface 16. Preferably, aluminum based lithium enriched layers 11 are disposed on internal surface 14 and external surface 16. However, layer 11 may be disposed on one of internal surface 14 and external surface 16. Layer 11 includes, by weight percent based on the total weight of the layer 11, lithium (Li) preferably within a range from about 0.1% to about 9.9%.

An aluminum based cladding 18 is disposed on each aluminum based lithium enriched layer 11. Cladding 18 includes, by weight percent based on the total weight of cladding 18, magnesium (Mg) preferably within a range from about 0.1 to 2%, more preferably being 0.2% to about 0.7%. In addition, cladding 18 preferably may also include, e.g., sodium (Na) within a range from about 0.01% to about 0.1%, silicon (Si) within a range from about 4% to 13%, manganese within a range from about 0 to about 1%, copper within a range from about 0.01% to 0.1%, zinc within a range from about 0 to about 0.3%, beryllium (Be) within a range from about 0.01% to about 0.7%, impurities not exceeding a total of ~1%, the balance being aluminum.

It should be appreciated that layer 11 and cladding 18 are made by rolling aluminum sheets of different alloys which are disposed as described above on surfaces 14 and 16 as desired by methods well known in the art.

Additionally, cladding 18 may contain cesium (Cs) within a range of from about 0 to about 2% by weight based on the weight of the composition cladding. When cesium is included in cladding 18, the magnesium in the core materials may be included in an amount up to about 3%, more preferably in a range between 0.4% and 2.5% by weight, i.e., in a greater amount than when cesium is not included in cladding 18. Preferably, cesium is included in cladding 18 because it substitutes for cesium fluoride in the flux. During the CAB brazing operation, the cesium in cladding 18 will diffuse to the surface to reduce MgO—CsO and allow the braze joint to form soundly. The addition of cesium in the cladding provides optimal aluminum oxide and magnesium oxide dissociation in aluminum braze materials.

Referring to FIGS. 1 through 4, heat exchanger assembly 10 includes at least one aluminum based component 22 disposed adjacent cladding 18, which is to be joined by brazing to tube 12. For example, heat exchanger assembly 10 may include a turbulator 20 disposed within tube 12 adjacent cladding 18 on internal surface 14. Turbulator 20 extends longitudinally and laterally in a series of undulations. Turbulator 20 breaks up the flow of fluid passing through tube 12 in use to effect heat transfer. In another example, heat exchanger assembly 10 includes a fin 22 disposed adjacent cladding 18 on the external surface 16 of tube 12. Fin 22 extends longitudinally and laterally in a series of undulations. Turbulator 20 and fin 22 are each made of an aluminum based material such as the Aluminum Association 3XXX series aluminum alloys. Turbulator 20 and fin 22 may be clad with cladding 18 material and layer 11 material disclosed above.

For manufacture of heat exchanger assembly 10, turbulator 20 and fin 22 are joined to the tube 12 using a CAB furnace brazing process. A brazing flux 13 according to the present invention is applied to a joint between tube 12 and any component to be joined to tube 12 by brazing, i.e., turbulator 20 or fin 22. The flux can be applied onto the joint area by any means such as brushing, dipping, and spraying, the latter being preferred because it provides more uniform application.

The modified aluminum brazing flux of the present invention may be formed using a conventional aluminum flux such as NOCOLOK™, but preferably includes additives added into this flux selected from cesium fluoride, lithium fluoride or their mixture, as provided in Evans et al. The modified flux used in the invention preferably includes at least cesium fluoride. This is because cesium melts before lithium and would flow into the joint area readily to dislodge the aluminum oxide and form a sound braze joint. Either of these fluorides or their mixture is preferably included in the modified aluminum flux in an amount of at least 3 weight percent based on the total weight of the flux.

More preferably, the cesium fluoride, lithium fluoride or their mixture is present in the modified flux in an amount of 3 to 30%. When a mixture of cesium and lithium fluoride are included in the modified flux, they are optimally present in a ration of from 1:1 to 3:1. It is sometimes advantageous to employ a mixture because this allows the flux to be provided with an optimal flux melting temperature based on the particular mixture. Because the lithium and/or cesium modified aluminum fluxes have lower surface tension when melted than the unmodified flux, they wet the joining surfaces well and advantageously form fillets of increased size at the joints. In addition, this modified flux acts to advantageously disrupt the aluminum oxide layer and aid in the prevention of the formation of magnesium oxide at the joint area. These advantages result in stronger brazed joints.

For manufacture of heat exchanger assembly 10, turbulator 20 fin 22 are joined to tube 12 using a CAB furnace brazing process. During the brazing process, since the aluminum oxide layer has been disrupted and hence made porous by the flux, the Magnesium (and cesium, if present) in the cladding 18 liquefies at or about 550° C. and flows through the porous aluminum oxide layer present on external surface 16 to wet external surface 16. This wetting allows the braze material to flow into a joint to be formed between tube 12 and other components of heat exchanger assembly 10 and creates a sound braze joint.

The inclusion of the lithium in layer 11 acts to further prevent the magnesium from migrating out of the core material and hence further substantially prevents the formation of undesirable magnesium oxides which interfere with the formation of a sound braze joint. It has been found that, due to the volume size of lithium, lithium atoms contained in layer 11 diffuse towards adjacent surfaces 14,16 of tubes 12 quicker than magnesium atoms contained in tubes 12. Because of their relatively small volume size, lithium atoms are not as impeded by the aluminum based material as magnesium atoms are when diffusing therethrough. The diffused lithium acts as an oxygen scavenger on respective surfaces 14,16 and creates lithium oxides which can be broken down by the brazing flux. The lithium atoms diffuse to respective surfaces 14,16 first and react with oxygen molecules before the magnesium atoms can, forming an effective magnesium barrier. It should also be appreciated that the fins 22 and turbulators 20 as well as plates and manifolds of evaporators (not shown) may have layer 11 and cladding 18.

The CAB furnace brazing process mentioned hereinabove is a conventional process. In the CAB process, heat exchanger assembly 10, with flux applied in at least the areas to be formed braze joints, is placed on a braze holding furnace fixture (not shown) and preheated, for example, to a temperature in a range from about 425 to 474 F. Heat exchanger assembly 10 and the braze holding furnace fixture are transferred to a prebraze chamber (not shown) where it is soaked for about 3–15 minutes at about 750 F. Subsequently, the hot heat exchanger assembly 10 and the braze holding furnace fixture are transferred to a conveyor and moved through a CAB furnace which is purged by applying nitrogen gas inside the CAB furnace 36.

In the CAB furnace, the heat exchanger assembly 10 is kept for 2–3 minutes at about 1095–1130 F. The brazed heat exchanger assembly 10 is then cooled, removed and applied for its intended use.

The present invention has been described in an illustrative manner. Terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An improved heat exchanger assembly comprising:
   at least one aluminum based tube including magnesium adapted to be exposed to an ambient atmosphere and having an internal surface and an external surface;
   an aluminum based cladding disposed adjacent one of the internal and external surfaces;
   at least one aluminum based component disposed adjacent the cladding;
   a brazing flux applicable between the aluminum based cladding and the aluminum based component to facilitate brazing in the ambient atmosphere; and
   an aluminum based lithium enriched layer disposed between the one of the internal and external surfaces and the aluminum based cladding;
   whereby the aluminum based lithium enriched layer is adapted to scavenge sufficient oxygen from the ambient atmosphere during brazing to form a sufficient barrier against the diffusion of magnesium from the aluminum based tube that the formation of undesirable magnesium oxide is resisted.

2. The heat exchanger assembly of claim 1 wherein the brazing flux includes a mixture comprising at least 3 weight percent cesium fluoride and lithium fluoride.

3. The heat exchanger assembly of claim 2 wherein the fluorides in the brazing flux mixture are within a range from at least 3 to 30 weight percent.

4. The heat exchanger assembly of claim 3 wherein the ratio of the cesium fluoride to the lithium fluoride in the mixture is within a range from 1:1 to 3:1.

5. The heat exchanger assembly of claim 1 wherein the at least one aluminum based tube comprises Aluminum Association 3XXX, 5XXX and 6XXX series aluminum alloys.

6. The heat exchanger assembly of claim 1 wherein the aluminum based cladding comprises, based on weight percent, magnesium (Mg) within a range from about 0.1% to about 2%, sodium (Na) within a range from about 0.01% to about 0.1%, silicon (Si) within a range from about 4% to 13%, manganese (Mn) within a range from about 0 to about 1%, copper (Cu) within a range from about 0.01% to about 0.1%, zinc (Zn) within a range from about 0 to about 0.3%, beryllium (Be) within a range from about 0.01% to about 0.7%, impurities not exceeding a total of 1%, and a balance being aluminum.

7. The heat exchanger assembly of claim 1 wherein an aluminum based component is disposed adjacent the cladding on both surfaces and further comprises:
   a turbulator disposed adjacent the cladding on the internal surface, and
   a fin disposed adjacent the cladding on the external surface.

8. The heat exchanger assembly of claim 1 wherein the at least one aluminum based component comprises material of the Aluminum Association 3XXX series aluminum alloys.

9. The heat exchanger assembly of claim 1 wherein the lithium in the aluminum based lithium enriched layer ranges from about 0.1 percent to about 9.9 percent by weight based on the weight of the aluminum based lithium enriched layer.

10. A method of manufacturing an improved heat exchanger assembly for an automotive vehicle, the method comprising:
    providing at least one aluminum based tube including magnesium adapted to be exposed to an ambient atmosphere and having an internal surface and an external surface;
    applying an aluminum based lithium-enriched layer to at least one of the internal and external surfaces;
    applying an aluminum based cladding to the aluminum based lithium enriched layer;
    disposing at least one aluminum based component adjacent the cladding;

applying a brazing flux to a joint between the cladding and the at least one aluminum based component to facilitate brazing in the ambient atmosphere; and joining the at least one tube and the at least one aluminum based component together in the ambient atmosphere using a controlled atmosphere brazing process.

11. The method of claim 10 wherein the at least one aluminum based tube comprises one of Aluminum Association 3XXX, 5XXX and 6XXX series aluminum alloys.

12. The method of claim 10 wherein said aluminum based cladding comprises, based on weight percent, magnesium (Mg) within a range from about 0.01% to about 2%, sodium (Na) within a range from about 0.01% to about 0.1%, silicon (Si) within a range from about 4% to 13%, manganese (Mn) within a range from about 0 to about 1%, copper (Cu) within a range from about 0.01% to about 0.1%, zinc (Zn) within a range from about 0 to about 0.3%, beryllium (Be) within a range from about 0.01% to about 0.7%, impurities not exceeding a total of 1%, and a balance being aluminum.

13. The method of claim 10 wherein an aluminum based component is disposed adjacent the cladding on both surfaces and comprises:

a turbulator disposed adjacent the cladding on the internal surface, and a fin disposed adjacent the cladding on the external surface.

14. The method of claim 10 wherein the at least one aluminum based component comprises material of the Aluminum Association 3XXX series aluminum alloys.

15. The method of claim 10 wherein the aluminum based lithium enriched layer includes lithium ranging from about 0.1 percent to about 9.9 percent by weight based on the weight of the aluminum based lithium enriched layer.

* * * * *